United States Patent [19]

Rittenbach

[11] Patent Number: 4,499,467
[45] Date of Patent: Feb. 12, 1985

[54] DOPPLER RADAR SETS WITH TARGET DIRECTION SENSING CAPABILITY

[75] Inventor: Otto Rittenbach, Neptune, N.J.

[73] Assignee: The United States of America as represented by the Secretary of the Army, Washington, D.C.

[21] Appl. No.: 368,482

[22] Filed: Apr. 14, 1982

[51] Int. Cl.³ .............................................. G01S 13/62
[52] U.S. Cl. .................... 343/9 R; 343/5 NQ
[58] Field of Search ............... 343/5 NQ, 9 R, 7.7, 343/8, 9 R, 17.1 R

[56] References Cited

U.S. PATENT DOCUMENTS

| | | | |
|---|---|---|---|
| 3,088,109 | 4/1963 | Meyer | 343/9 |
| 3,422,430 | 1/1969 | Rittenbach | 343/9 |
| 3,562,750 | 2/1971 | Fishbein et al. | 343/9 X |
| 3,796,989 | 3/1974 | Ravas et al. | 343/5 NQ X |
| 3,896,436 | 7/1975 | Johnson | 343/9 X |
| 4,217,582 | 8/1980 | Endō et al. | 343/5 NQ X |
| 4,217,585 | 8/1980 | Fishbein et al. | 343/7.7 |

FOREIGN PATENT DOCUMENTS 0152479  11/1980  Japan ................ 343/5 NQ

OTHER PUBLICATIONS

Koelle et al., "Doppler Radar w/Cooperative Target Measures to Zero Velocity and Senses the Direction of Motion", Mar. 1977, pp. 492–493.
Skelnik, "Introduction to Radar Systems", McGraw-Hill 1962, pp. 100–103.

Primary Examiner—T. H. Tubbesing
Assistant Examiner—Gilberto Barrón, Jr.
Attorney, Agent, or Firm—Anthony T. Lane; Jeremiah G. Murray; Edward Goldberg

[57] ABSTRACT

Doppler radar sets of the type including circuitry for determining and displaying sense of target motion along the radar beam. The Doppler phase shifters in the I and Q channels of pulse radars of this type are designed to operate at frequencies much higher than the Doppler baseband frequencies by selecting one of the Doppler sidebands of the radar's pulse repetition frequency, or one of the sidebands of a harmonic of such pulse repetition frequency, for application to said Doppler phase shifters. The higher operating frequency simplifies the design and construction of the Doppler phase shifters.

7 Claims, 5 Drawing Figures

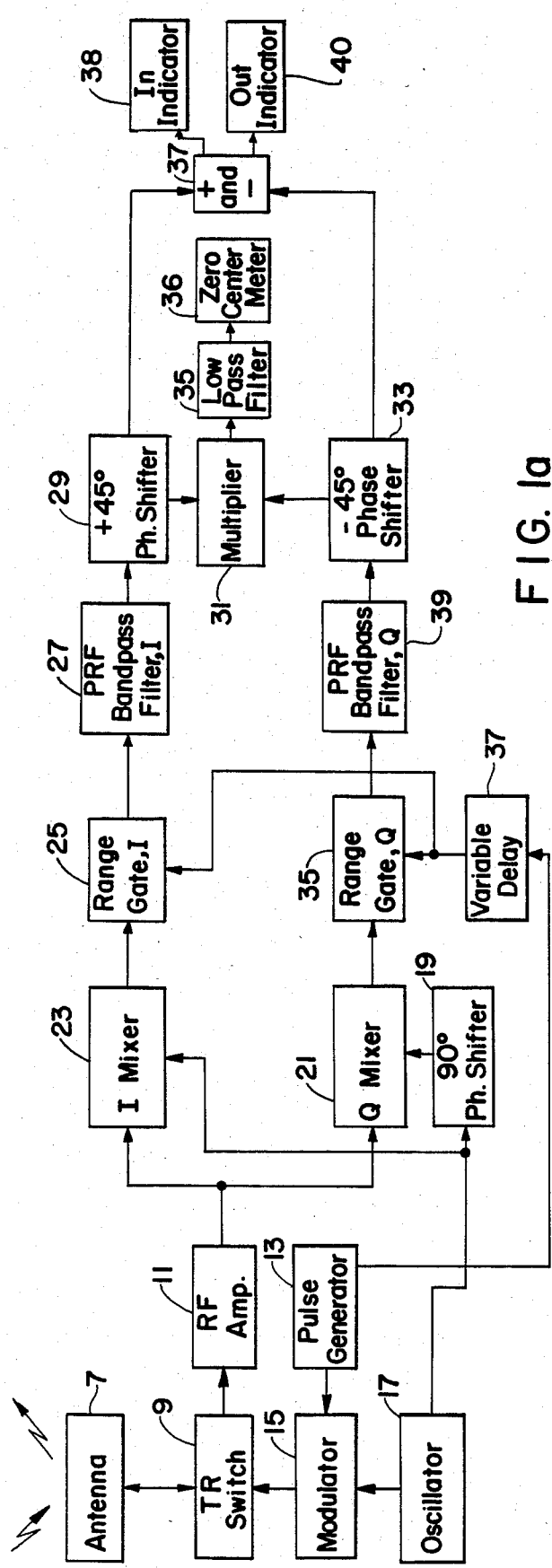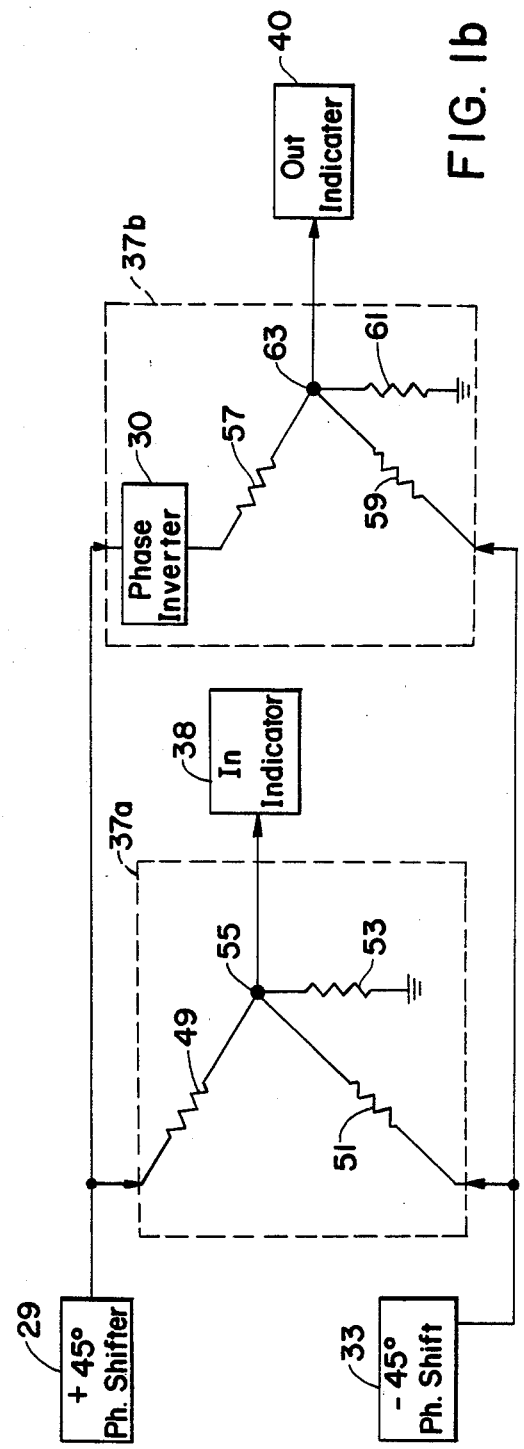

DOPPLER RADAR SETS WITH TARGET DIRECTION SENSING CAPABILITY

The invention described herein may be manufactured, used and licensed by or for the Government for govermental purposes without the payment to me of any royalties thereon.

BACKGROUND OF THE INVENTION

This invention relates to Doppler type radar sets and more particularly radars of this type which include a capability for sensing the direction of target movement along the radar beam. Radars with this direction sensing capability require a pair of quadrature phased channels usually known as the I and Q channels as part of the receivers thereof. The relative phases of the Doppler signals in the outputs of these I and Q channels determine the direction of target motion along the radar beam. The I and Q channel signals must be differentially phase shifted by 90°, usually by means of a +45° phase shifter in one of these channels and a −45° phase shifter in the other channel. The outputs of the Doppler phase shifters can then be correlated by means for example of a multiplier and low pass filter which produce a voltage which varies in polarity with the direction of target motion. This voltage can be applied to a zero-centered meter to display the target direction information. In the prior art these Doppler phase shifters have operated at the Doppler baseband which for a typical radar with a transmitter frequency of 1 GHz intended to detect moving targets will be usually of the order of 1 to 1000 Hz. Accurate phase shifters for use over several octaves below 1000 Hz are bulky and expensive. The present invention provides a higher operating frequency for these phase shifters so that they are operating at a much smaller relative bandwidth but at the same absolute Doppler bandwidth. This results in more compact and inexpensive phase shifters which need not be accurately phase matched over several octaves, without the need for complex circuitry such as upconverters and downconverters.

SUMMARY OF THE INVENTION

The invention comprises Doppler radar sets which include Doppler phase shifters as part of the I and Q channels thereof and which operate at many times the Doppler baseband frequency, and which yield target sense of direction information. This concept is implemented by operating the Doppler phase shifters at either the fundamental or a harmonic of the radar's pulse repetition frequency (PRF) and utilizing the Doppler sidebands around said frequencies to obtain the required information.

It is thus an object of this invention to provide simplified circuitry for Doppler radar sets of the type including sense of target motion capability.

Another object of the invention is to provide Doppler radar sets with simplified and improved circuitry for determining the direction of target movement along the radar beam.

A further object is to provide radars intended for detecting relatively slow moving targets with simpler and less expensive components.

Another object is to provide pulse Doppler radars with less expensive and less critical Doppler phase shifters.

BRIEF DESCRIPTION OF THE DRAWINGS

FIG. 1a is a block diagram of a pulse radar embodying the present invention.

FIG. 1b shows a portion of the circuit of FIG. 1a in greater detail.

DETAILED DESCRIPTION OF A PREFERRED EMBODIMENT

To illustrate the problems of the prior art circuitry mentioned above, assume that a radar operates at 1000 MHz. This frequency results in a wavelength of 30 cm or approximately 1 foot. For Doppler radars of the type involved in the present invention, the highest expected target velocity might be about 1000 mph, or 1467 ft/sec. A target at this speed moving directly along the beam, that is either directly toward the radar or directly away from it would thus traverse 1467 radar wavelengths per second and thus produce a Doppler shift of $2 \times 1467$ Hz or 2934 Hz. The slowest moving target of interest for such a radar might be a slow moving helicopter traveling at 10 ft/sec. If such a target is moving at an angle to the radar beam or boresight axis, the component of its velocity along the beam is what determines the Doppler shift. If the target's path makes an angle of 80° with the boresight axis, his velocity of 10 ft/sec will produce a velocity component along the beam of 10 ft/sec×cos 80° or +1.736 ft/sec. This radial velocity will yield a Doppler shift of only 3.472 Hz. Thus the ratio of the highest to lowest Doppler frequencies in this example is approximately 845, or over 9 octaves, all of them below 2934 Hz. As stated above, the combination of the low Doppler frequencies and the extreme bandwidth requires bulky, complex and expensive phase shifters.

Figure 3:
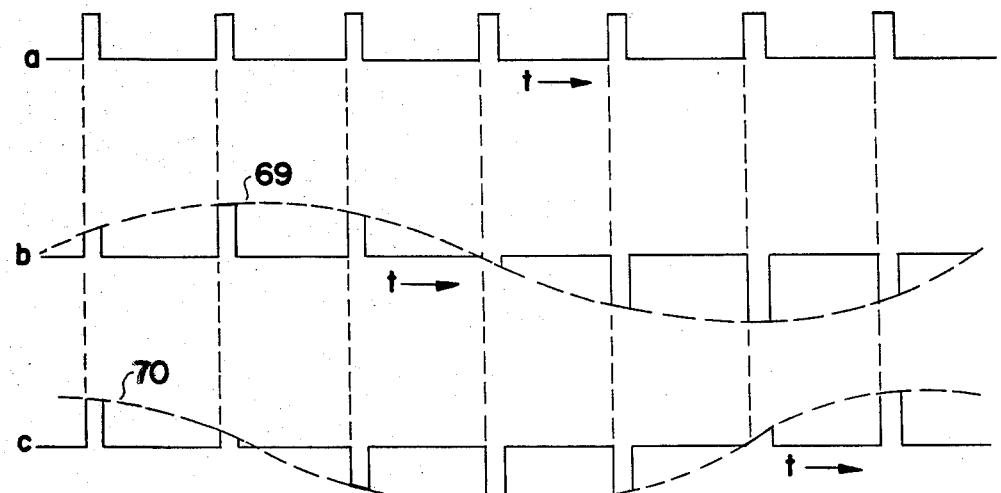
FIG. 3 are video waveforms of a pulse Doppler radar.

These disadvantages are overcome by the novel pulse Doppler radar of FIG. 1a. In this radar the CW oscillator 17 has its output applied to modulator 15 which selectively applies the oscillator output to TR switch 9 under the control of pulse generator 13 to form the pulses for transmission. The frequency of pulse generator 13 thus determines the pulse repetition frequency (PRF) of the radar. The duplex antenna 7 both transmits and receives with the TR switch 9 controlling the transmit and receive functions, in known fashion. The radar receiver comprises dual I and Q channels, as shown. The received echo signals are applied to RF amplifier 11 from TR switch 9 and thence in parallel to the I and Q mixers 23 and 21. A small sample of the output of oscillator 17 is directly applied to the I mixer as a local oscillator signal and to the Q mixer via 90° phase shifter 19. This circuitry results in a coherent, zero intermediate frequency, quadrature channel receiver. The mixer outputs comprise video signals comprising pulse trains at the PRF for stationary targets, and Doppler-modulated pulse trains for moving targets. It is assumed that the PRF is many times the highest expected Doppler frequency shift, thus the Doppler-modulated video pulse trains will comprise trains of bipolar pulses at the PRF, amplitude modulated by the Doppler frequency. Such pulse trains are shown in FIGS. 3b and 3c.

The radar of FIG. 1a includes an optional range gate feature comprising I and Q range gates 25 and 35 in both of the channels following the I and Q mixers. The output of pulse generator 13 is applied to variable delay circuit 37, the output of which is arranged to open the range gates 25 and 35 at a selected time after the transmission of the radar pulses. This selected time is determined by the setting of variable delay 37 and results in the selection of targets at round trip transit times corresponding to the setting of variable delay circuit 37.

The Doppler-modulated video signals in both channels therein are, in accordance with the invention, applied to I and Q PRF bandpass filters 27 and 39. These filters are tuned either to one of the sidebands of the PRF fundamental frequency or to one of the sidebands of one of the harmonics thereof, and have bandwidths wide enough to pass all of the Doppler frequencies in the selected sideband around the PRF frequency or the harmonic thereof. If it is assumed that in the radar of the above example, the PRF is 10 KHz these Doppler sidebands would extend 2934 Hz above and below 10 kHz. Thus the Doppler phase shifters 29 and 33 would be designed to operate from 7.066 kHz to 10 kHz or from 10 kHz to 12.934 kHz depending on whether the upper or lower sideband is selected, a very small relative bandwidth covering only a fraction of an octave. If one of the harmonics of the PRF is chosen, for example the second or third harmonic, the relative bandwidth would be further reduced by a factor of 2 or 3.

The Doppler phase shifter 29 of the I channel of FIG. 1 is arranged to shift the phase of the output of the filter 27 by +45° and the Q channel phase shifter 33 shifts the phase of the output of the Q channel filter 39 by −45°. These phase shifters are designed to operate at the frequencies to which the PRF bandpass filters 27 and 39 are tuned.

The remainder of the circuitry of FIG. 1 is the circuitry for deriving the sense of target motion information from the phase shifter outputs. The correlation circuitry referred to above comprises the multiplier 31, low pass filter 35 and zero-centered meter 36. The multiplier will produce an output with a positive or negative dc component depending on the relative phases of the signals applied thereto from the Doppler phase shifters. A product output from multiplier 31 of one polarity will indicate an incoming target and a product of the opposite polarity an outgoing target. The low pass filter 35 attenuates the Doppler frequencies and harmonics thereof and passes the dc components to zerocentered meter 36. The meter 36 will thus show negative deflection for outgoing targets and positive deflection for incoming ones, or vice versa.

The adder and subtractor circuits 37 are also connected to the Doppler phase shifter outputs and have an In indicator 38 and an Out indicator 40 connected thereto. This circuitry comprises another type of sense of target motion display in which the Doppler phase shifter outputs are added by means of a resistive matrix and subtracted by means of a phase inverter plus a second resistive matrix. An output from the adder will indicate incoming targets and an output from the subtractor will indicate outgoing ones. Separate indicators, 38 and 40, are provided for these circuits. The indicators may be lamps or audible alarms, or both. The advantage of the adder and subtractor type indicators are that they can function simultaneously if two targets with opposite senses of motion are in the radar beam at the same time. On the other hand, correlation circuitry may indicate zero if there are incoming and outgoing targets simultaneously in the radar's beam and they produce echoes of approximately the same strength. Thus radars of this type may include both the sense of direction systems shown in FIG. 1a.

FIG. 1b shows the details of the adding and subtracting circuitry shown in block form in FIG. 1. The adder matrix comprises the three resistors within dashed box 37a. It includes three resistors 49, 51, and 53 connected in a star arrangement with resistor 49 connected to the output of phase shifter 29 and resistor 51 connected to the other phase shifter 33. The third resistor 53 is grounded. The terminal 55 is the center of the matrix at which any sum voltage will appear. This point is connected to the In indicator 38.

The subtractor circuitry within box 37b comprises three similarly connected resistors 57, 59, and 61, however phase inverter 30 is connected between the output of I channel phase shifter 29 and resistor 57. Resistor 59 is connected to Q channel phase shifter 33. The Out indicator 40 is connected to matrix terminal 63. Thus the circuit of 37b will produce an output at 63 if there is a difference between the phase shifter outputs, which is indicative of an outgoing moving target.

Figure 2:
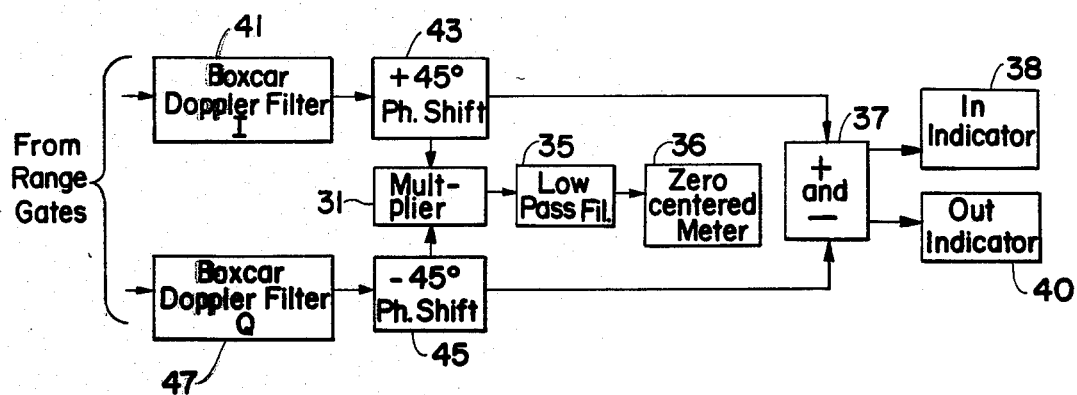
FIG. 2 is a circuit of a portion of a prior art pulse radar of the Doppler type.

In the prior art, pulse Doppler radars of this type have processed the Doppler signals at baseband by means of circuitry such as that of FIG. 2. This figure shows only the circuitry of such a radar subsequent to the range gates 25 and 35 of FIG. 1. The video signals in the output of the range gates were, as shown in FIG. 2, applied to I and Q boxcar Doppler filters 41 and 47, where the Doppler baseband frequencies in the Doppler-modulated video pulse trains were enhanced by the boxcar circuit which in effect samples the peak of each video pulse and holds that amplitude until the next pulse arrives. The circuits 41 and 47 also included low pass filters arranged to attenuate any residual components of boxcar output at frequencies higher than the highest Doppler baseband frequency. The baseband Doppler signals of the I channel were then applied to +45° phase shifter 43 and those of the Q channel to −45° phase shifter 45. The phase shifter outputs were then applied to correlation circuitry comprising multiplier 31, low pass filter 35 and zero-centered meter 36 which functioned in the same way as the similar circuitry of FIG. 1. The adder and subtractor 37 and its associated indicators 38 and 40 are also shown in FIG. 2.

Figure 4:
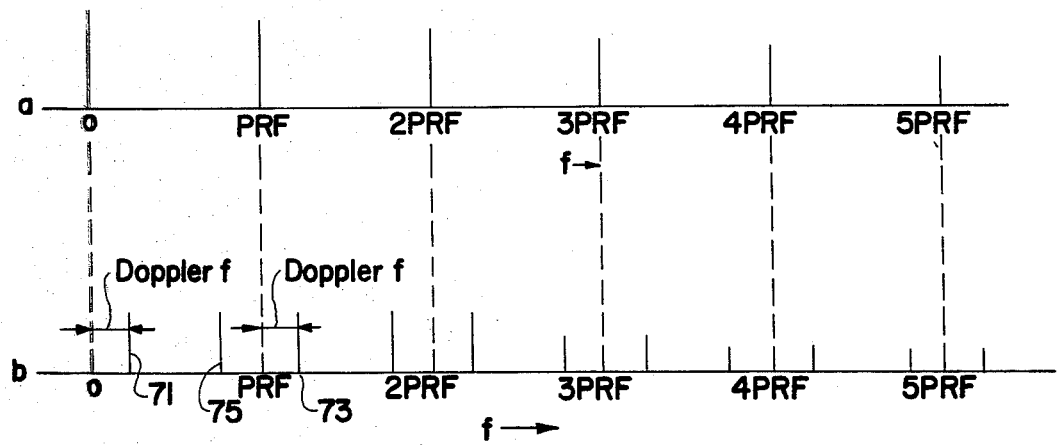
FIG. 4 are graphs showing the frequency components of the video pulse trains of FIG. 3.

FIG. 3a shows a video pulse train such as that which would result in the circuitry following the second detector of a pulse radar receiver resulting from a stationary target, or at the outputs of the range gates of FIG. 1a. As can be seen, this pulse train comprises unmodulated pulses comprising the envelopes of the transmitted microwave pulse train. FIG. 4a shows the frequency components of such a pulse train. The largest component will be the dc or zero frequency component indicated by the vertical line at zero frequency, with sinusiodal components of decreasing amplitude at the pulse repetition frequency (PRF) and harmonics thereof. The amplitudes of the frequency components decrease with the frequency according to the well known sin x/x relationship.

FIGS. 3b and 3c show Doppler-modulated video pulse trains representing the echo of a moving target, of a pulse Doppler radar where the Doppler frequencies are much lower than the PRF. These two waveforms represent the video pulse trains of the I and Q channels of a radar such as that of FIG. 1a. As can be seen, these pulse trains are bipolar in that the pulses thereof alternate in polarity at the rate of the Doppler frequency.

The dashed waveform 69 of FIG. 3b is the Doppler frequency of one channel and the waveform 70 of FIG. 3c the Doppler frequency of the other channel. As can be seen, the curves 69 and 70 are shifted by 90° from each other, curve 69 being a sine wave and 70 a cosine wave.

The frequency components of such modulated pulse trains are shown in FIG. 4b. The lowest frequency therein is the Doppler baseband frequency 71. This is the frequency of the curves 69 and 70 of FIGS. 3b and 3c. The next frequency components are the upper and lower sidebands 73 and 75, respectively, which are above and below the fundamental PRF frequency by the amount of the Doppler baseband frequency. Thus, if 71 represents a Doppler frequency of 50 Hz, the components 73 and 75 would be 50 Hz above and 50 Hz below the PRF, respectively. Additional pairs of Doppler sidebands are located in this example 50 Hz above and below each of the harmonics of the PRF. These harmonics are indicated as 2PRF, 3PRF, etc. All of the Doppler frequencies are duplicated in the sidebands of the PRF and the harmonics thereof, although at decreasing amplitudes as the frequency increases. Thus the Doppler target information can be derived from any of these sidebands. As stated, the amplitudes of the higher PRF harmonics decrease and thus a trade-off must be struck between the advantages of the higher Doppler frequency against the lower amplitudes of the higher Doppler frequencies.

This technique can also be used with other types of radars which exhibit spectra like that of FIG. 4b, for example, chirp or pulse compression radar or code modulated pulse or CW radars.

While the invention has been described in connection with illustrative embodiments, obvious variations therein will occur to those skilled in this art, thus the invention should be limited only by the scope of the appended claims.

I claim:

1. A Doppler radar set comprising a pulse generator providing a pulse repetition frequency for operation of said radar at a frequency which is a high multiple of the highest expected Doppler shift frequency, means for receiving a video pulse signal at said pulse repetition frequency modulated by the Doppler frequency including a pair of quadrature receiving channels each including a mixer, the input to one mixer being phase shifted by 90° with respect to the other, a pulse repetition frequency bandpass filter coupled to each mixer in each channel, a Doppler phase shifter connected to each bandpass filter of each said channel, said Doppler phase shifters being adapted to shift the relative phases of the signals of said channels by 90°, and circuitry connected to the outputs of said Doppler phase shifters to determine and indicate the direction of moving target motion along the beam of said radar, and wherein said Doppler phase shifters are operated at said frequency higher than the frequency of the highest Doppler frequency of said radar set.

2. The radar set of claim 1 wherein said Doppler phase shifters are tuned to a band of frequencies comprising one of the sidebands of said pulse repetition frequency or one of the harmonics thereof.

3. The radar set of claim 1 wherein said circuitry connected to the outputs of said Doppler phase shifters comprises correlation circuitry comprising a multiplier, a low pass filter, and a zero-centered meter.

4. The radar set of claim 1 wherein said circuitry connected to the outputs of said Doppler phase shifters comprises an adder and subtractor circuit with an In indicator connected to said adder and an Out indicator connected to said subtractor circuit.

5. The radar set of claim 1 wherein said circuitry connected to the outputs of said Doppler phase shifters comprises correlation circuitry comprising a zero-centered meter and further circuitry comprising an adder and subtractor circuit with an In indicator connected to said adder and an Out indicator connected to said subtractor circuit.

6. The radar of claim 1 wherein said circuitry connected to the outputs of said Doppler phase shifters comprises correlation circuitry plus adder and subtractor circuits with indicators connected to each of said last-named circuits.

7. The radar set of claim 1 including a range gate connected between each mixer and each bandpass filter of each channel and a variable delay circuit connected between said pulse generator and each range gate, said delay circuit opening the range gates at selected times after the transmission of radar pulses.

* * * * *